United States Patent [19]

Burton

[11] 4,360,226
[45] Nov. 23, 1982

[54] ROLL-FLEX CONNECTOR

[75] Inventor: James A. Burton, Houston, Tex.

[73] Assignee: Hydril Company, Los Angeles, Calif.

[21] Appl. No.: 184,360

[22] Filed: Sep. 5, 1980

[51] Int. Cl.³ .............................................. F16L 27/00
[52] U.S. Cl. .................................... 285/223; 285/264;
 285/268
[58] Field of Search ...................... 285/223, 263, 334.4,
 285/332.1, 264, 268; 64/11 R, 11 F, 13, 32 F;
 403/121; 308/2 A, 2 R

[56] References Cited

U.S. PATENT DOCUMENTS

| | | | |
|---|---|---|---|
| 2,536,452 | 1/1951 | Leissler | 285/264 X |
| 2,680,005 | 6/1954 | Storm | 285/264 X |
| 3,243,209 | 3/1966 | Chertok | 285/332.1 X |
| 3,323,842 | 6/1967 | Hanson | 403/121 X |
| 3,504,902 | 4/1970 | Irwin | 285/223 X |
| 3,504,904 | 4/1970 | Irwin et al. | 285/263 X |
| 3,636,716 | 1/1972 | Castellanos | 403/121 X |
| 4,183,556 | 1/1980 | Schwemmer | 285/223 X |

Primary Examiner—Dave W. Arola
Attorney, Agent, or Firm—John H. Dodge, II

[57] ABSTRACT

The present invention relates to a connector for mechanically joining members having large force loading while enabling limited relative angular movement therebetween. The connector employs a plurality of stacked metal roll plates to provide rolling metal-to-metal contact while avoiding sliding movement of contacting members transmitting the force load between connector members. Each of the roll plates is provided with a concave and convex load carrying surface with the radius of the concave surface greater than that of the convex surface to provide rolling rather than sliding contact. To obtain universal angular movement, one embodiment of the connector employs a single stack of spherical surface roll plates while a second embodiment employs a plurality of roll plate stacks having substantially cylindrical load carrying surfaces. The roll plates are maintained in operating alignment by resilient members extending through the stack and may be enclosed for protection by a resilient cover forming a chamber that may be filled by a lubricant.

21 Claims, 7 Drawing Figures

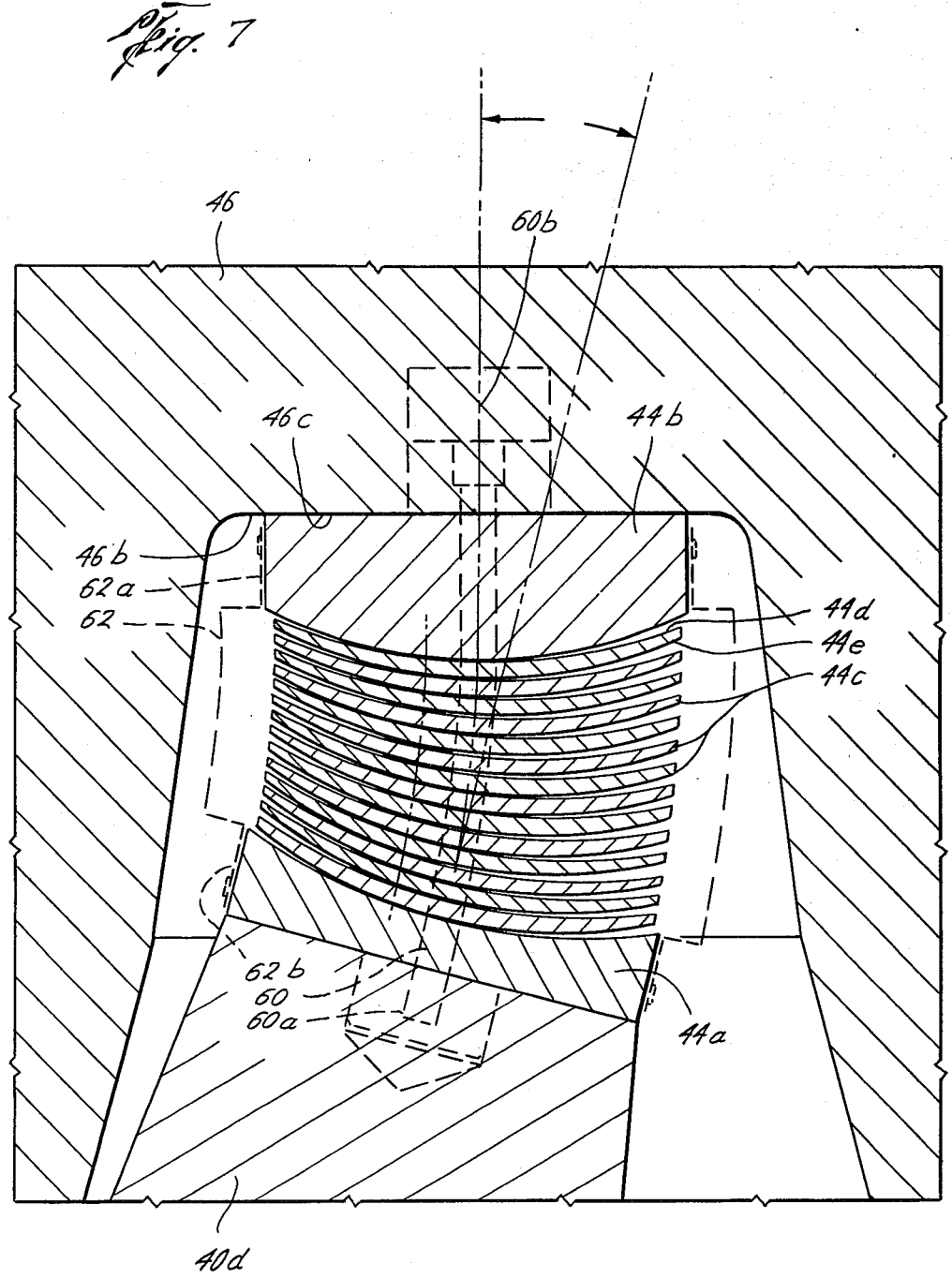

ROLL-FLEX CONNECTOR

TECHNICAL FIELD

The present invention relates to the field of connectors for mechanically joining members in a force or load transfer relationship and in particular to a high strength mechanical connector for tension force loading having means for compensating for the limited relative angular movement of the connected members which may preferably be fluid conduits.

BACKGROUND ART

Mechanical connectors for joining members to transmit forces while providing for limited relative angular movement between the connected members are known. Such flex connectors, as they are commonly known, have been developed to carry either tension forces or loading, compressive loading or combinations of force loading between the two connected members. Such connectors have generally been designed as a compromise between permissible angular misalignment and force load carrying capacity. To increase the force load carrying capacity, efforts were also made to avoid combination loadings and subject the connection to only pure tension or compression force loading.

By limiting angular movement to pivoting movement about a single axis, a relatively large load carrying capacity could be maintained. However, such limited angular movement was unacceptable since most applications required a capability of universal, i.e. two axis, movement rather than a greater range of single axis angular compensation. Universal angular movement about a pair of intersecting perpendicular pivot axes normally requires a relatively complex connector structure for even a small angle of movement.

Frequently, such universal movement connectors have employed rubber or other resilient components to provide the desired angular flexibility for movement or alignment. While such an arrangement is satisfactory for many applications, such resilient components have inherent load carrying limitations even when formed in a metal/rubber laminate due to the rubber extrusion under continuous heavy force loading and rubber deterioration due to ageing. Accordingly, such components have not found widespread acceptance in connections subject to high force levels or where access for maintenance is restricted.

To eliminate load carrying rubber components, ball joints have been developed for providing metal-to-metal load carrying surfaces while providing for the desired universal angular movement. Such ball joint connectors have mating load carrying surfaces that are designed to slide on each other, but which slide surfaces are easily damaged. Sliding movement causes both wear and galling of these surfaces which requires frequent expensive repairs due to the high stress contact friction forces produced by the large forces. In addition, the large force moments necessary to produce the angular movement of the joint also require large side force loadings that may damage other structural components.

Such design and operating problems are often complicated by the additional requirement that the flexible connector also serve as an internal flow conductor for fluid under pressure. An example of such a fluid conductor application where the load carrying forces are great is in marine risers used in offshore drilling and production operations. In marine riser applications, the required primary load carrying capability is tension loading as other loading forces are controlled by other equipment. Another known application for large force load transfer or carrying connectors is tension legs on tension leg platforms which are also used in offshore operations to produce liquid hydrocarbons.

SUMMARY OF THE INVENTION

The present invention relates to mechanically connecting at least two members in a force carrying or transmitting relationship while enabling limited universal angular movement therebetween. The disclosed connector employs a stacked plurality of formed metal roll plates to provide a metal-to-metal force or load carrying capability that is resistant to deterioration from ageing or material deformation to provide a long usable connector life. The stacked plates are arranged to permit a limited amount of rolling movement between adjacent plates to provide the angular compensation without the sliding movement that frequently damages the contact or load carrying surfaces. The plates are formed with outer and inner surfaces of different radius to provide clearance to enhance the rolling effect while maintaining proper alignment. Each of the stack of plates may be enclosed in a protective environment that also excludes entry of foreign materials between the plates. A conduit is preferably provided to communicate fluid under pressure between the connected members.

Two embodiments of a connector are disclosed. In the first embodiment, a plurality of stacked metal plates disposed between first and second connector members are provided with spherical load carrying surfaces to provide for limited universal angular movement between the first and second members. A central opening may be provided through the spherical plates to provide a concentric flow passage for the conduit if desired.

In the second embodiment, two pairs of stacked plurality of roll plates are utilized to provide the desired universal angular movement. The first pair of plurality of stacked substantially cylindrical plates provides rotational movement about a first axis while the second pair of plurality of stacked substantially cylindrical plates provides rotational movement about a second axis that is disposed perpendicular to the first axis. An intermediate member engages the two pairs of plurality of stacked plates for transferring the load with metal-to-metal contact.

In both embodiments, the roll plates are formed with inner and outer load carrying surfaces of different diameter or radius in order that contact of adjacent plates will be rolling rather than sliding while compensating for angular misalignment. Each of the stacks of plates are provided with retainers for maintaining the plates in the desired stacked relationship that may be enclosed by a flexible envelope to provide a protective environment for the plates and which also serves to exclude foreign matter. A central opening may be formed in either embodiment to provide clearance for a flow passage.

BRIEF DESCRIPTION OF THE DRAWINGS

FIG. 7 is a side view of the stacked roll plates illustrating the angle of movement;

FIG. 8 is a view similar to FIG. 1 illustrating the use of a flexible hose conduit.

DESCRIPTION OF THE PREFERRED EMBODIMENT

The mechanical connector of the present invention, generally designated C in the Figs., provides a structural component for joining members carrying or transmitting a force or load while enabling limited universal angular movement therebetween. In the first embodiment of the mechanical connector C illustrated in FIG. 1, a first or lower member 10 is provided with suitable means such as by welding at 12 for connecting with an underlying foundation or base structure (not illustrated) of any desired shape for ultimately absorbing the force or load transmitted through the connector. In a marine riser application, the lower member 12 may be attached to a wellhead connector (not illustrated) mounted on top of a blowout preventer stack as is known. Disposed above the first member 10 is the second or upper connector member 14 which is movable relative to the lower member 10 to provide the angular compensation. The upper member 14 is provided with suitable connecting means, such as a two step helical thread, at 14a for connecting with an upper component transmitting the force such as the marine riser 16 as is well known to those of ordinary skill in the art.

Figure 1:
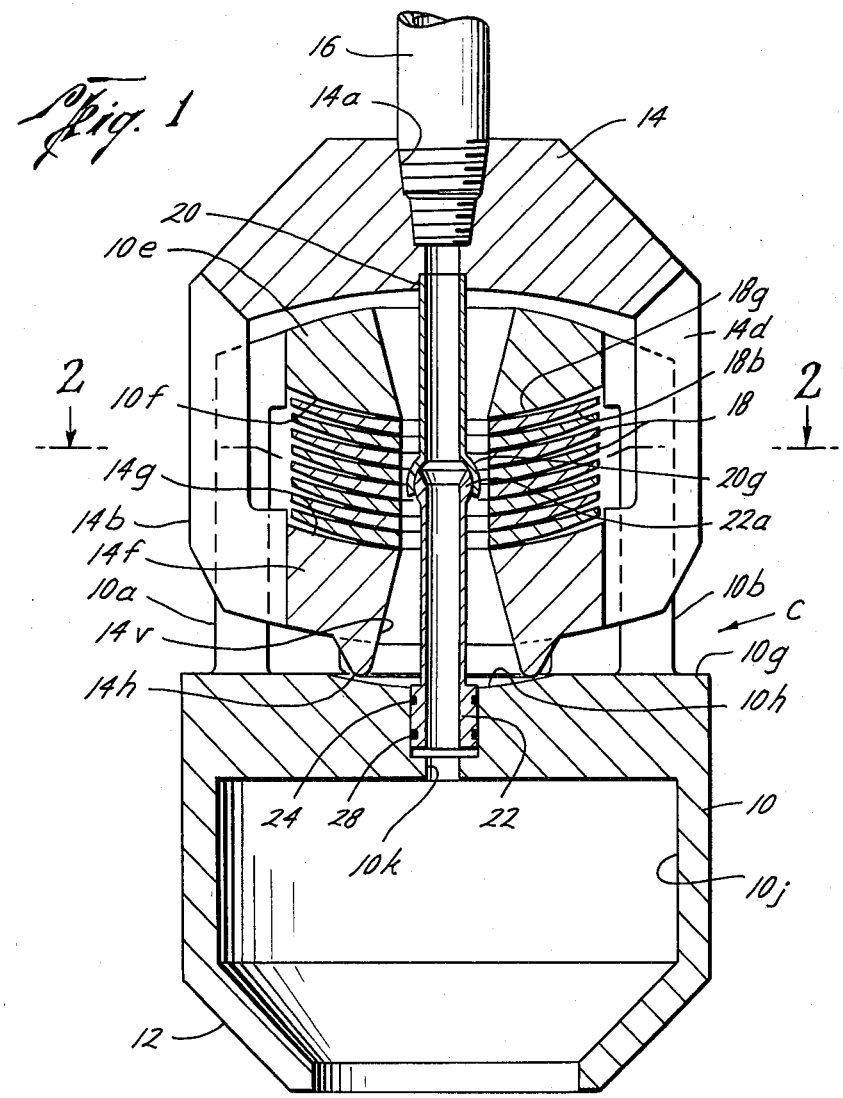
FIG. 1 is a side view, in section, of a flexible connector built in accordance with the present invention.
Figure 2:
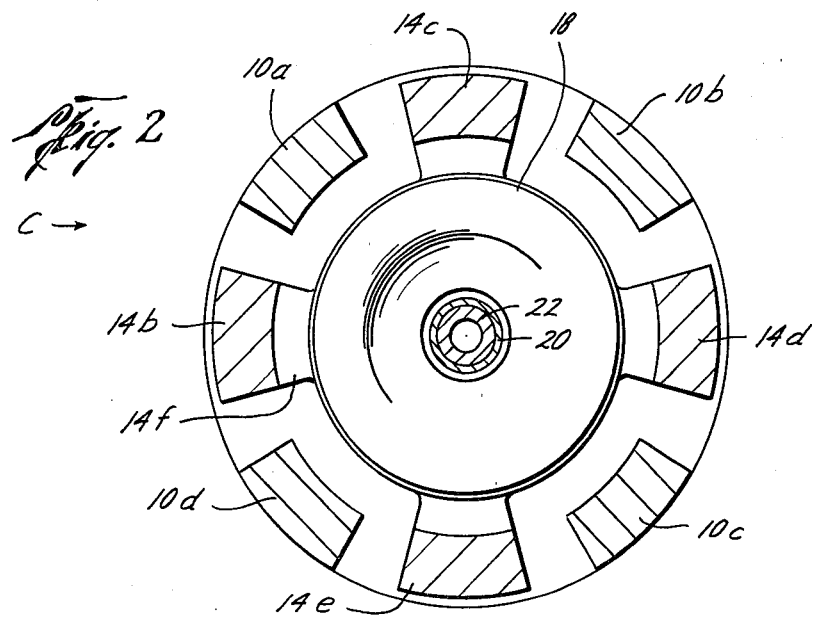
FIG. 2 is a view taken along line 2—2 of FIG. 1.
Figure 3:
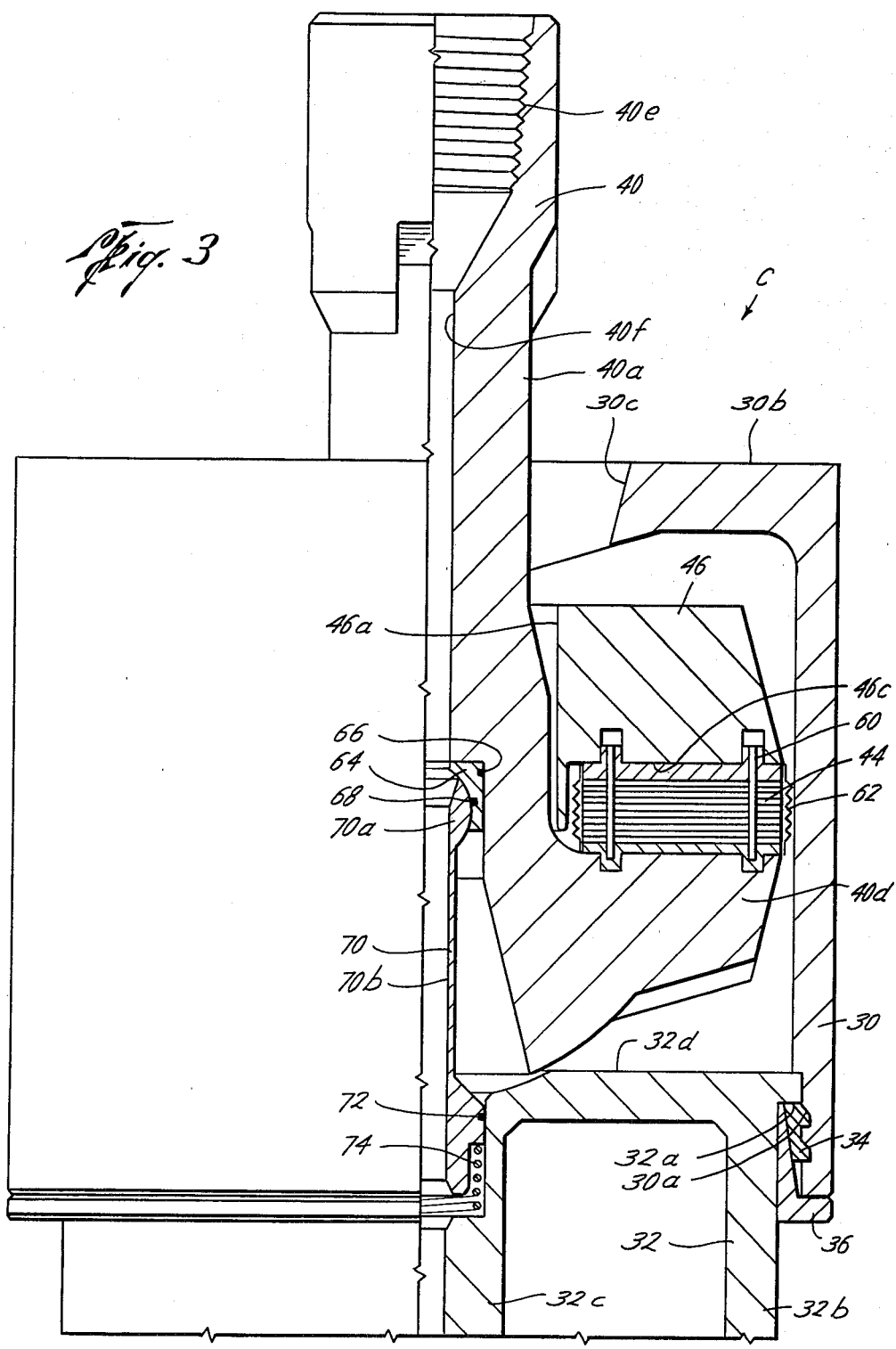
FIG. 3 is a side view, partially in section, of another embodiment of a flexible connector built in accordance with the present invention.

As best illustrated in FIG. 2, the lower member 12 has a plurality of upwardly extending support fingers 10a, 10b, 10c, 10d which are joined together at a disk or circular portion 10e forming the downwardly facing spherical load carrying surface 10f of the connector (FIG. 1). Disposed in the windows formed between the equi-circumferentially spaced fingers 10a, 10b, 10c, and 10d are corresponding plurality of downwardly extending support fingers 14b, 14c, 14d, and 14e of the upper member 14. The fingers 14b, 14c, 14d, and 14e terminate in a circular portion or disk 14f providing the upwardly facing spherical load carrying surface 14g aligned with support surface 10f. For the purposes of assembly, the upper disk 10e secured to the members 10a, 10b, 10c, and 10d may be attached to the lower member 10 after the collar 14f is temporarily supported on the surface 10g which fingers 10a, 10b, 10c, and 10d extend upwardly from. The disk 14f may also be releasably secured to the fingers 14b, 14c, 14d, and 14e if desired. Sufficient clearance is provided between the adjacent support fingers to enable the desired range of universal angular movement of the upper member 14 relative to the fixed lower member 10 (FIG. 2).

As illustrated in FIG. 1, a plurality of stacked metal roll support plates, each of which is designated 18, is disposed between the support surface 10f of lower member 10 and the support surface 14g of the upper member 14. The support plates 18 transmit the force load applied to the connector C in metal-to-metal contact between the load carrying surfaces 10f and 14g while enabling limited universal angular movement between the upper member 14 relative to the lower member 10. The support plates 18 are arranged to roll upon the adjacent plate when compensating for the angular movement to avoid any sliding contact therebetween which would result in damage or galling. Such rolling movement is provided by forming each of the support plates 18 with an upper inner spherical concave support surface 18a and an outer convex spherical support shape 18b of different radius of curvature. By having the inner substantially spherical concave load carrying surface 18a formed on a radius greater than the facing radius of the outer spherical convex load carrying surface 18b, clearance is provided between the outer portions of the adjacent disk shaped plates 18 to enable the rolling or rocking movement. In the embodiment of FIG. 1, the stacked plates 18 are provided with a disk shape and spherical roll surface to provide for universal angular movement between the upper member 14 and the lower member 10 with a single stack of roll plates 18.

By the use of associated equipment (not illustrated), the mechanical connector C is primarily subjected only to tension or tensile, i.e. pull apart, mechanical force loading and only incidental force loadings of other types will be transmitted from the upper connector member 14 to the lower member 10 for transmittal into the underlying structure or foundations. However, incidental compressive force loads will be experienced by the connector such as during assembly and to compensate for such loading, a support guide nose 14h is formed on the lower portion of the disk 14 for engagement with the support surface 10g of the lower member. The surface 10g is provided with a complementary spherical shaped recess 10h for enabling guiding movement of the nose 14h on the surface 10g during assembly. After assembly, all of the tension force loading from the upper member 14 is transmitted to the lower member 10 through the stacked plates 18 as the nose 14h is moved away from the surface 10h by assembly. It will be understood that the connector C can be designed to transmit compressive loads rather than tension loads without departing from the scope of the present invention.

In some applications of mechanical connector C it may be desirable to also include a fluid flow path between the upper member 14 and the base member 10. Preferably, such fluid paths are disposed concentrically within the mechanical connector C for communicating the drill or riser pipe 16 with the hollow stationary manifold 10j formed by the lower member 10. To provide such a path, the load surface forming disk 10e of the lower member 10 and the plates 18 are provided with a concentric or central cut-away portion 10k through which a downwardly extending tubular fluid flow containing member 20 secured to the movable upper member 14 is located. The central opening or passage of the upper member 20 communicates with the riser pipe 16 for providing the flow passage through the mechanical connector C in the usual manner. The collar 14f of the upper member is also provided with a central opening 14j in which a corresponding tubular fluid flow containing member 22 mounted on the lower member 10 is disposed. In FIG. 8, a desired fluid flow path using a conventional threaded end flexible hose is illustrated.

The lower tubular flow member 22 is slidingly mounted with the central opening 10k formed in the lower member 10 and is provided with an enlarged spherical head or ball 22a which is sealingly received in a cap or socket 20a formed in the lower portion of the upper tubular flow member 20. The lower sleeve 22 is provided with a plurality of O-rings 24 and 28 which provide the sliding fluid seal between the lower sleeve 22 and the lower member 10. The sliding movement between the sleeve 22 and base 10 prevents the transmitting of the loading forces from the member 22 to the lower member 10. Besides isolating the member 10 from the transmitted force, the longitudinal sliding movement of the lower flow member 22 compensates for the relative longitudinal movement of the upper member 14. A flexible hose (not illustrated) may be substituted for the tubular flow member 20 and 22 to provide the flow conductor.

As will be described in greater detail, the stacked roll plates 18 are maintained in alignment by flexible tension members (not illustrated) and surrounded by flexible covers (also not illustrated) to provide a protective enclosed environment about the roll plates 18. The enclosed chamber may be filled with oil or other hydrocarbon lubricants to protect and lubricate the metal roll plates 18 as they roll to compensate for the angular movement between the upper member 14 and lower member 10. The enclosing covers also exclude dirt and other foreign materials from entering between the metal roll plates 10 as they move.

As noted previously, the second embodiment of the mechanical connector C of the present invention is illustrated in FIGS. 3-7. The connector C is provided with a lower stationary housing element or member 30, best illustrated in FIG. 3, that is similar in purpose and function to the lower base member 10 of the first embodiment. For ease of assembly and attachment, the lower housing member 30 is structurally provided with a lower attachment section 32 to which the housing 30 is releasably secured by a plurality of circular or arcuate latching segments or dog members 34 that are held in the annular recess 30a of the member 30 by the tapered latch ring 36. The segments 34 bear against the annular flange 32a provided by the lower attachment section 32 for securing the housing member 30 to the attachment section 32. The attachment section 32 is preferably formed with an outer tubular portion 32b to provide means for attachment to the blowout preventer stack (not illustrated) while an inwardly spaced inner downwardly projecting tubular portion 32c forms a central flow passage for the fluid.

Figure 4:
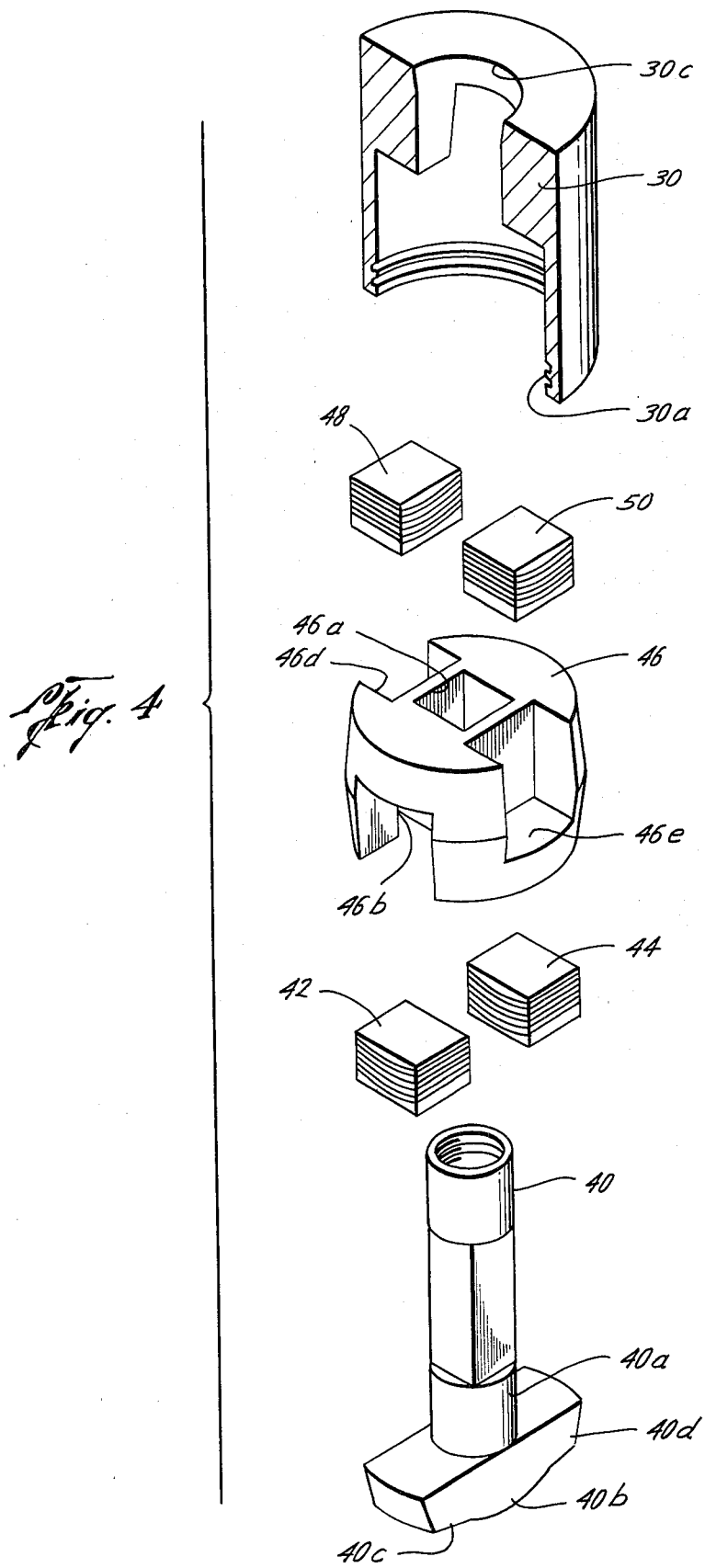
FIG. 4 is an exploded view of the connector of FIG. 3 illustrating the arrangement of the movable components.

The housing member 30 has an inwardly projecting collar 30b having a central opening 30c formed therethrough in which is disposed an upper connector member 40 that is similar in purpose and function to the upper connector member 14 of the first embodiment. As illustrated in FIG. 4, the upper member 40 is formed substantially anchor shaped having an upwardly extending shank 40a and a lower crown 40b extending traversely outwardly to form a pair of support arms 40c and 40d. The lower crown 40b of the upper member 40 is disposed adjacent the support surface 32d of the base portion 32 for supporting the member 40 during assembly as previously described with respect to the first embodiment.

Figure 5:
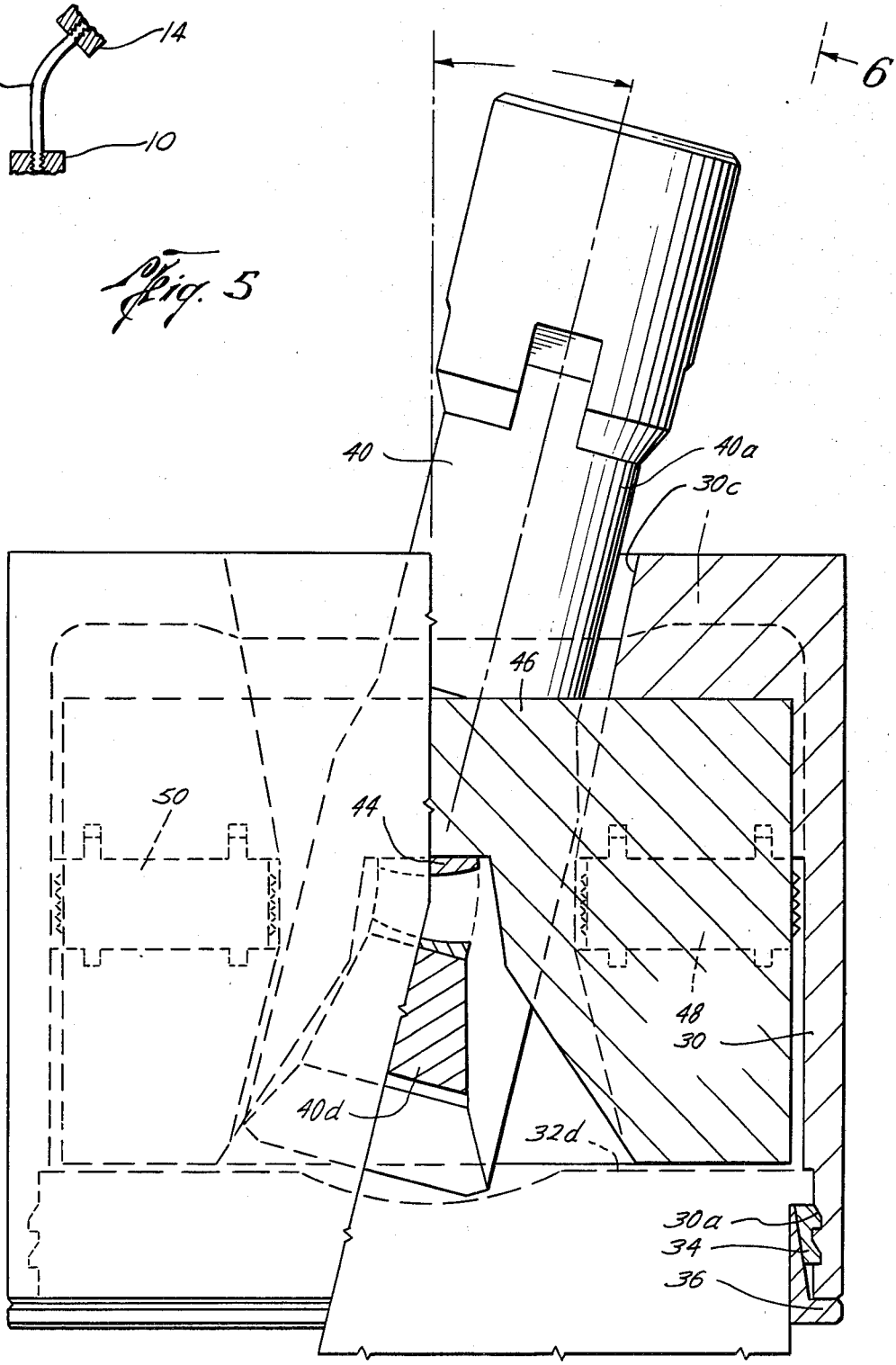
FIG. 5 is a side view similar to FIG. 3, but turned 90° to illustrate the angular movement.
Figure 6:
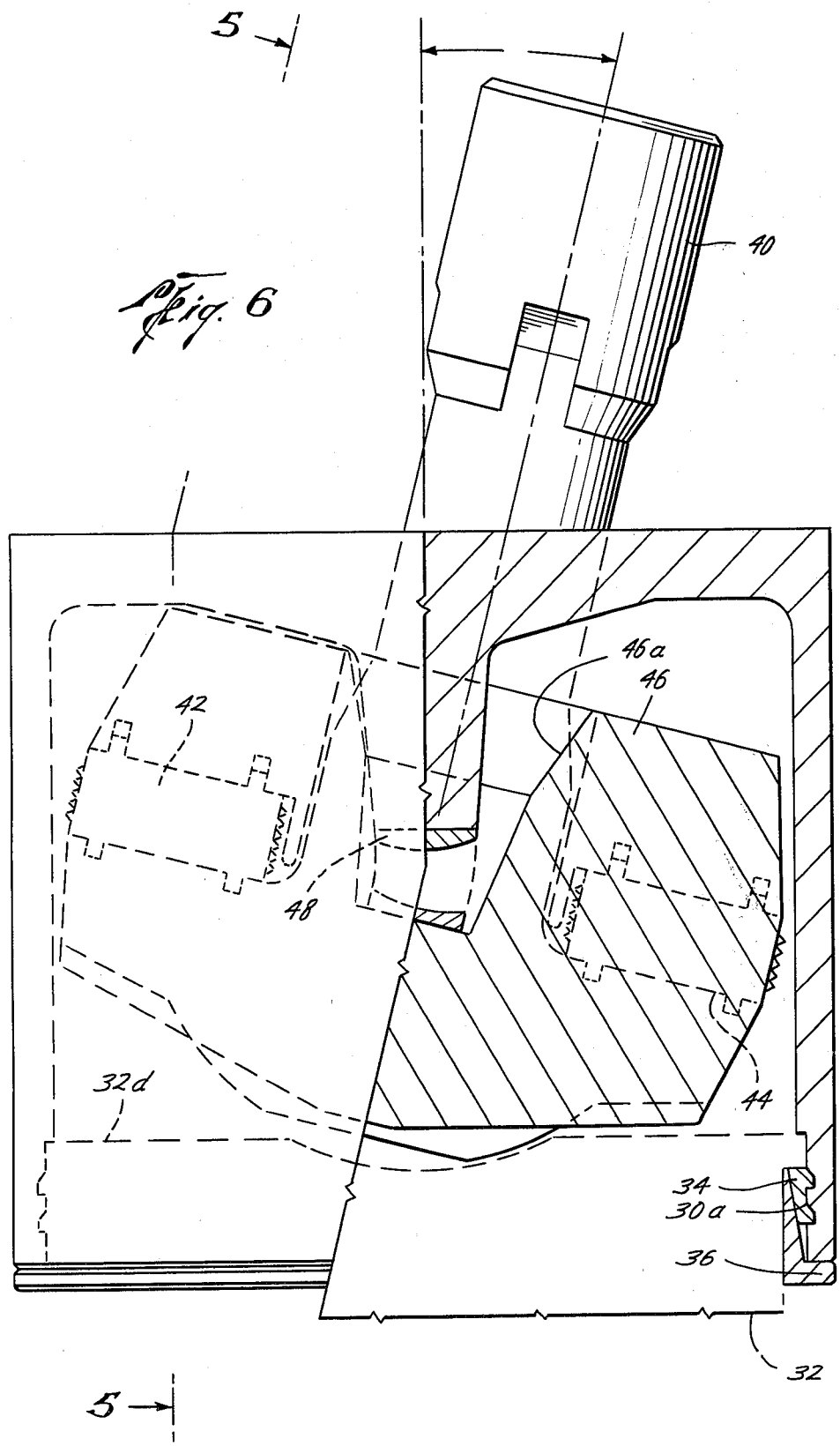
FIG. 6 is a view taken along line 6—6 of FIG. 5 and which illustrates along line 5—5 the view of FIG. 5.

Each of the support arms 40c and 40d mounts a plurality of stacked roll plates 42 and 44 which provide a first pivot axis for rotating movement by the upper member 40. The single plane movement range of the member 40 about the single axis provided by the aligned stacked plates 42 and 44 is illustrated in FIG. 5. The pair of stacked roll plates 42 and 44 engage an intermediate movement member 46 in slots 46b and 46c and which member carries a second plurality of aligned stacked roll plates 48 and 50 to provide a second axis of rotation located at right angles to the angle of rotation formed by the stacked plates 42 and 44. Movement in this plane by the member 46 provides the universal range of angular movement for the upper member 40 relative to the stationary housing 10. To achieve such movement range, the intermediate member 46 is provided with a central opening or clearance passage 46a through which the central stem 40a of the upper member 40 extends.

The intermediate member pivots or rolls relative to the housing 30 about a similar pair of aligned stacked plates 48 and 50 received in upwardly facing slots 46d and 46e. By the shape of the intermediate member 46 locating each of the spaced stacks of roll plates 42, 44, 48, and 50 on the same level or elevation so that their two axis or rotation intersect it at right angles, the upper member 40 is provided a limited range of universal angular movement relative to the fixed housing member 30.

As best illustrated in FIG. 7, the plurality of stacked plates 44 may be provided with a lower transistor member 44a which rests on the flat support surface formed by the support arm 40d of the upper member 40. An upper transistor member 44b may be provided for forming a flat support surface which engages the downwardly spacing support shoulder 46b of the intermediate member 46. Between the end roll plate members 44a and 44b is disposed a plurality of similar shaped cylindrical roll plates 44c which provide the rolling movement. Each of the substantially cylindrical plates 44c have an inner concave surface 44d and an outer convex surface 44e in a manner similar to the spherical plates 18 of the first embodiment. Rather than the spherical shape of the plates 18 the surfaces 44d and 44e are cylindrical or modified barrel type shape since they only roll about a single axis. The tapering barrel shape is to assist in maintaining plate 44c alignment while the cylindrical rolled surfaces provide a greater contact area between adjacent plates to increase the load carrying capability without overstressing the contact surfaces during the rolling movement.

To maintain alignment of the stacked plates 44, a pair of resilient alignment members 60 extend through the stack having a first end 60a releasably secured to the support arm 40d of the upper member 40 and an upper end 60b releasably secured to the intermediate member 46. In addition to maintaining the plates 44c in alignment during the rolling or pivoting movement, the alignment member 60 also serves to hold each of the plurality of stacked plates 44 together as a unit during assembly. A tubular roll plate cover 62 has a first open end 62a secured or attached to the upper plate 44b and a lower open end 62b secured to the bottom plate 44a for enclosing the plates 44c to exclude dirt or other material. The cover 62 completely encloses the plates 44a and may be filled with a hydrocarbon or other suitable plate lubricant to protect and lubricate movement of the plates 44c while excluding the entry of dirt and other foreign matter therebetween. The other stacks 42, 48 and 50 are constructed and arranged in a similar manner to the stacked plates 44 and need not be further described.

If it is desirable to provide a flow passage, the upper member 40 may be provided with a flow passage 40f formed through the shank 40a of the upper connector 40 adjacent the threads 40e. A fluid sealing socket 64, disposed in the passage 40f, carries an O-ring 66 for sealing with the upper member 40 and an O-ring 68 which seals with an enlarged ball portion 70a of a tubular member 70. The tubular member 70 carries an O-ring 72 for slidably sealing with the flow tubular portion 32c of the attachment section 32. A spring 74 is disposed between the attachment section 32c and the tubular member 30 for maintaining the tubular flow tube member 70 upwardly in engagement with the socket 64 while enabling sliding movement between the tubular 70 and the housing portion 32 as the member 40 moves angularly relative to the housing 30. A flow passage 70b formed through the tubular member 70 communicates the bore 40f of the upper member 40 in the housing portion 32 for enabling flow of fluid through the connector C in the usual manner.

Operation

In the use and operation of the present invention, either embodiment of the connector C is assembled in the manner illustrated using known techniques. The first embodiment is preferably mounted with the blowout preventer stack and a riser pipe 16 is connected to the upper member 14 by threaded engagement at 14a in the usual manner for lowering the blowout preventer stack from the floating drilling vessel. After operably positioning of the sea bed, a drill pipe (not illustrated) may be run through the riser 16 and through the tubular members 20 and 22 in the usual manner for conducting drilling operations. The drilling fluid is circulated down the drill string and back upwardly through the mechanical connector C and riser 16 in the usual manner to the floating vessel. As the floating vessel and riser 16 moves, the upper member 14 connected to the riser 16 will also move and which movement is compensated by the rolling movement of the adjacent plates 18. The tension load on the riser 16, which is the primary load, is transmitted from the vessel and riser through the connector C by the load surface 14g contacting the metal roll plates 18 which transmits the tension load to the lower member 10 by engagement with the load carrying surface 10f. Such force is transmitted through the member 10 to the underlying foundation structure in the usual manner.

In the operation of the second embodiment, anchor member 40 transmits the upwardly acting tension force through the roll plates 42 and 44 to the intermediate member 46. The intermediate member 46 transmits the tension forces from the first set of stacked plates 42 and 44 to the second set of stacked plates 48 and 50 where the tension loading is transmitted to the stationary housing 50. While under such tension loading, the upper member 40 moves relative to the housing 30 through the range of angular movement enabled by the plurality of stacked plates 42, 44, 48 and 50 that are arranged to provide the intersecting rotating movement axis.

The foregoing disclosure and description of the invention are illustrative and explanatory thereof, and various changes in the size, shape and materials, as well as in the details of the illustrated construction may be made without departing from the spirit of the invention.

I claim:

1. A connector for joining members in large force load transfer contact while enabling limited relative angular movement between the load carrying connected members by controlling the movement of engaged load carrying surfaces to prevent damage thereto from connector movement, comprising:

a first member forming a longitudinal axis and having a load carrying surface of substantially spherical configuration, said first member having means for connecting with a first structural assembly;

a second member forming a longitudinal axis and having a load carrying surface of substantially spherical configuration, said carrying surface of said second member disposed for facing said load carrying surface of said first member to prevent separation of said first member and said second member in response to force loading of said first and second members in a first direction along said longitudinal axes, said second member engageable with said first member to prevent separation in response to a force loading in a direction along said longitudinal axes opposite to the first direction, said second member having means for connecting with a second structural assembly; and a plurality of stacked roll support plates operably disposed between said load carrying surfaces, each of said roll plates having an outer substantially spherical load carrying surface and an inner substantially spherical load carrying surface formed by a radius greater than the forming radius of said outer spherical load carrying surface, said inner surface supporting the outer surface of said adjacent plate while enabling said outer surface to roll on said inner surface of said adjacent plate to compensate for angular movement of said first member relative to said second member without sliding movement between said plurality of plates while transmitting the force load between said first and second members.

2. The connector as set forth in claim 1, wherein:

said substantially spherically configured load carrying surface of one of said members having a convex shape and the other of said members spherically configured load carrying surface having a concave shape, said outer surface of each of said stacked plurality of plates positioned adjacent said concave spherically configured load carrying surface of said other member while transmitting the load.

3. The connector as set forth in claim 1, wherein:

said first member having a convex load carrying surface;

said second member having a concave load carrying surface; and said outer surface of each of said plates having a convex shape and said inner surface having a concave shape, said stack of said plates disposed to position said convex outer surfaces in load carrying contact with the concave inner surface of said adjacent plate and said concave surface of said second member.

4. The connector as set forth in claim 3, wherein:

said first and second members having flow passages formed therethrough; and means for conducting flow of fluid between said flow passage of said first member and said flow passage of said second member while compensating for relative movement between said first member and said second member.

5. The connector as set forth in claim 4, wherein said means for conducting flow of fluid includes:

a ball and socket connection for compensating for angular movement between said first and second members; and a telescoping connection for compensating for linear movement between said first and second members.

6. The connector as set forth in claim 4, wherein said means for conducting includes:
a flexible hose compensating for angular and linear movement between said first and second members.

7. The connector as set forth in claim 4, wherein:
the first structural assembly includes an underlying structure for absorbing the force load; and
the second structural assembly includes an upper component transmitting the force load to the connector.

8. The connector as set forth in claim 7, wherein:
the force load transmitted to said second member from the upper component is primarily a tension loading attempting to separate said first member from said second member.

9. The connector as set forth in claim 1, including:
means for enclosing said plurality of stacked roll plates to exclude entrance of undesired foreign material between said plates when rolling on each other to provide for angular movement.

10. The connector as set forth in claim 9, wherein:
said means for enclosing said plurality of stacked roll plates is filled with a suitable liquid to provide a protective environment for said roll plates when rolling on each other to provide for angular movement.

11. The connector as set forth in claim 1, wherein:
each of said plurality of roll plates is formed of metal to provide a metal-to-metal load carrying contact.

12. The connector as set forth in claim 1, including:
means for connecting said plurality of plates to maintain operating alignment of stacked plates.

13. The connector as set forth in claim 12, wherein:
said means for connecting including flexible guides extending through said plurality of stacked plates.

14. The connector as set forth in claim 13, wherein:
each of said flexible guides is secured at one end with said first member and at the other end with said second member.

15. A connector for joining members in large force load transfer contact while enabling limited relative angular movement between the load carrying connected members by controlling the movement of engaged load carrying surfaces to prevent damage thereto from connector movement, comprising:
a first member forming a longitudinal axis having means for securing the connector with an underlying structure for absorbing the force load transmitted through the connector;
a second member forming a longitudinal axis having means for securing the connector with an upper component for transmitting the force load to the connector;
means disposed between said first member and said second member for enabling limited relative angular movement therebetween while maintaining slide free metal-to-metal force load transmitting contact between said first and said second members to prevent separation of said first and said second members in response to a force loading along the longitudinal axis of said first and said second members, said second member engageable with said first member to prevent separation in response to a force loading in a direction along said longitudinal axis opposite to the first direction; and
a first plurality of stacked metal roll support plates disposed in force load transfer engagement with said first member, each of said roll plates having an outer substantially rounded load carrying surface and an inner substantially rounded load carrying surface formed by a radius greater than the forming radius of said outer load carrying surface, said inner surface supporting the outer surface of said adjacent plate while enabling said outer surface to roll on said inner surface of said adjacent plate to compensate for angular movement of said first member relative to said second member without sliding movement between said plurality of plates while transmitting the force load between said first and second members.

16. The connector as set forth in claim 15, including:
an intermediate member in force load transfer engagement with said first plurality of stacked roll plates enabling angular movement between said first member and said intermediate member about a first axis.

17. The connector as set forth in claim 16, including:
a second plurality of stacked metal roll plates in force load transfer engagement with said second member and said intermediate member, said second plurality of stacked roll plates enabling angular movement between said second member and said intermediate member about a second axis disposed perpendicular to said first axis to provide for universal relative angular movement between said first and second members.

18. A connector for joining members in large force load transfer contact while enabling limited relative angular movement between the load carrying connected members by controlling the movement of engaged load carrying surfaces to prevent damage thereto from connector movement, comprising:
a first member forming a longitudinal axis having means for securing the connector with an underlying structure for absorbing the force load transmitted through the connector;
a second member forming a longitudinal axis having means for securing the connector with an upper component for transmitting the force load to the connector;
means disposed between said first member and said second member for enabling limited relative angular movement therebetween while maintaining slide free metal-to-metal force load transmitting contact between said first and said second members to prevent separation of said first and said second members in response to a force loading along the longitudinal axis of said first and said second members, said second member engageable with said first member to prevent separation in response to a force loading in a direction along said longitudinal axis opposite to the first direction; and
a plurality of stacked metal roll plates disposed in force load transfer contact between said first member and said second member, each of said roll plates having a concave load carrying surface and a convex load carrying surface, each of said plate's concave load carrying surfaces formed by a radius greater than the forming radius of said convex surface to enable said concave surface of said adjacent plate to roll on said convex surface for enabling the limited relative angular movement while maintaining slide free metal-to-metal contact.

19. A connector for joining members in large force load transfer contact while enabling limited relative angular movement between the load carrying connected members by controlling the movement of engaged load carrying surfaces to prevent damage thereto from connector movement, comprising:
- a first member forming a longitudinal axis having means for securing the connector with an underlying structure for absorbing the force load transmitted through the connector;
- a second member forming a longitudinal axis having means for securing the connector with an upper component for transmitting the force load to the connector;
- means disposed between said first member and said second member for enabling limited relative angular movement therebetween while maintaining slide free metal-to-metal force load transmitting contact between said first and said second members to prevent separation of said first and said second members in response to a force loading along the longitudinal axis of said first and said second members, said second member engageable with said first member to prevent separation in response to a force loading in a direction along said longitudinal axis opposite to the first direction; and
- a plurality of stacks with each of said stacks formed by a plurality of metal roll plates disposed in force load transfer contact between said first member and said second member, each of said roll plates having a concave load carrying surface and a convex load carrying surface, each of said plate's concave load carrying surface formed by a radius greater than the forming radius of said convex surface to enable said concave surface of said adjacent plate to roll on said concave surface for enabling the limited relative angular movement while maintaining slide free metal-to-metal contact.

20. The connector as set forth in claim 18 or 19, including:
- means for enclosing said plurality of stacked roll plates to exclude entrace of undesired foreign material between said plates when rolling on each other to provide for angular movement.

21. The connector as set forth in claim 18 or 19, including:
- means for connecting said plates to maintain operating alignment of each stack.

* * * * *